United States Patent
Duffin et al.

(10) Patent No.: US 7,913,814 B2
(45) Date of Patent: Mar. 29, 2011

(54) ACOUSTIC BAFFLE ASSEMBLY

(75) Inventors: Gary R. Duffin, Liberty, MO (US);
Benjamin Howard, Odessa, MO (US);
Dan Jordan, Liberty, MO (US); Tanya Estrin, Novi, MI (US); Michael Lupini, Milford, MI (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 12/399,128

(22) Filed: Mar. 6, 2009

(65) Prior Publication Data
US 2009/0223739 A1 Sep. 10, 2009

Related U.S. Application Data

(60) Provisional application No. 61/068,657, filed on Mar. 7, 2008, provisional application No. 61/125,221, filed on Apr. 23, 2008.

(51) Int. Cl.
| | |
|---|---|
| *E04B 1/84* | (2006.01) |
| *A47B 81/06* | (2006.01) |
| *G10K 11/00* | (2006.01) |
| *F02B 77/13* | (2006.01) |
| *B29C 65/00* | (2006.01) |
| *B29C 67/00* | (2006.01) |
| *B60J 7/00* | (2006.01) |
| *B32B 3/06* | (2006.01) |

(52) U.S. Cl. ........ 181/294; 181/196; 181/198; 181/204; 264/46.5; 264/46.6; 296/187.02; 428/99

(58) Field of Classification Search .................. 181/294, 181/198, 204, 196; 264/46.5, 46.6; 296/187.02; 428/99
See application file for complete search history.

(56) References Cited

U.S. PATENT DOCUMENTS

| | | | | |
|---|---|---|---|---|
| 5,160,465 | A | * | 11/1992 | Soderberg .................... 264/46.5 |
| 5,266,133 | A | | 11/1993 | Hanley et al. |
| 5,385,951 | A | | 1/1995 | Soderberg |
| 5,506,025 | A | * | 4/1996 | Otto et al. ........................ 428/98 |
| 5,573,027 | A | | 11/1996 | Hsiung |
| 5,631,304 | A | | 5/1997 | Hasegawa |
| 5,931,474 | A | * | 8/1999 | Chang et al. .................. 277/316 |
| 5,979,902 | A | * | 11/1999 | Chang et al. .................. 277/316 |
| 6,062,624 | A | * | 5/2000 | Crabtree et al. ............. 296/39.3 |
| 6,114,004 | A | * | 9/2000 | Cydzik et al. .................. 428/81 |
| 6,146,565 | A | * | 11/2000 | Keller .......................... 264/46.5 |
| 6,281,260 | B1 | | 8/2001 | Hanley, IV et al. |
| 6,413,611 | B1 | * | 7/2002 | Roberts et al. .................. 428/99 |
| 6,830,799 | B1 | | 12/2004 | Duffin et al. |
| 6,988,585 | B2 | * | 1/2006 | Mourieras et al. ............ 181/204 |
| 7,140,668 | B2 | | 11/2006 | Wesch et al. |

(Continued)

FOREIGN PATENT DOCUMENTS

JP 2005-319842 A 11/2005

(Continued)

*Primary Examiner* — Elvin G Enad
*Assistant Examiner* — Christina Russell
(74) *Attorney, Agent, or Firm* — Mary K. Cameron; Brooks Kushman P.C.

(57) ABSTRACT

An acoustic baffle assembly for sealing or baffling a hollow body having a mass of heat activated expandable material that is capable of activating at a predetermined temperature. A substrate supports the mass. The substrate has a central portion and spaced apart projections extending outwardly from the central portion. The projections are configured to control expansion of the mass.

20 Claims, 10 Drawing Sheets

U.S. PATENT DOCUMENTS

| | | |
|---|---|---|
| 7,160,491 B2 * | 1/2007 | Barz et al. .................... 264/46.6 |
| 7,199,165 B2 | 4/2007 | Kassa et al. |
| 7,247,657 B2 | 7/2007 | Duffin et al. |
| 7,255,388 B2 * | 8/2007 | Le Gall et al. ............ 296/187.02 |
| 7,335,413 B2 * | 2/2008 | Ui et al. ......................... 428/100 |
| 7,422,088 B2 * | 9/2008 | Ito ................................. 181/198 |
| 7,503,620 B2 * | 3/2009 | Brennecke et al. ....... 296/187.02 |
| 2002/0091171 A1 * | 7/2002 | Blank et al. ..................... 522/42 |
| 2002/0164450 A1 * | 11/2002 | Lupini et al. .................... 428/99 |
| 2004/0262853 A1 | 12/2004 | Larsen et al. |
| 2004/0266898 A1 | 12/2004 | Kassa et al. |
| 2005/0268454 A1 * | 12/2005 | White ............................. 29/592 |
| 2006/0272884 A1 * | 12/2006 | Vilcek et al. .................. 181/198 |
| 2007/0045866 A1 * | 3/2007 | Gray et al. ..................... 257/778 |
| 2009/0239962 A1 * | 9/2009 | Dobashi .......................... 521/95 |

FOREIGN PATENT DOCUMENTS

| | | |
|---|---|---|
| JP | 2006-001404 A | 1/2006 |
| WO | 2007012048 A2 | 1/2007 |
| WO | 2007117663 A2 | 10/2007 |
| WO | 2007117664 A2 | 10/2007 |
| WO | 2008021200 A1 | 2/2008 |

* cited by examiner

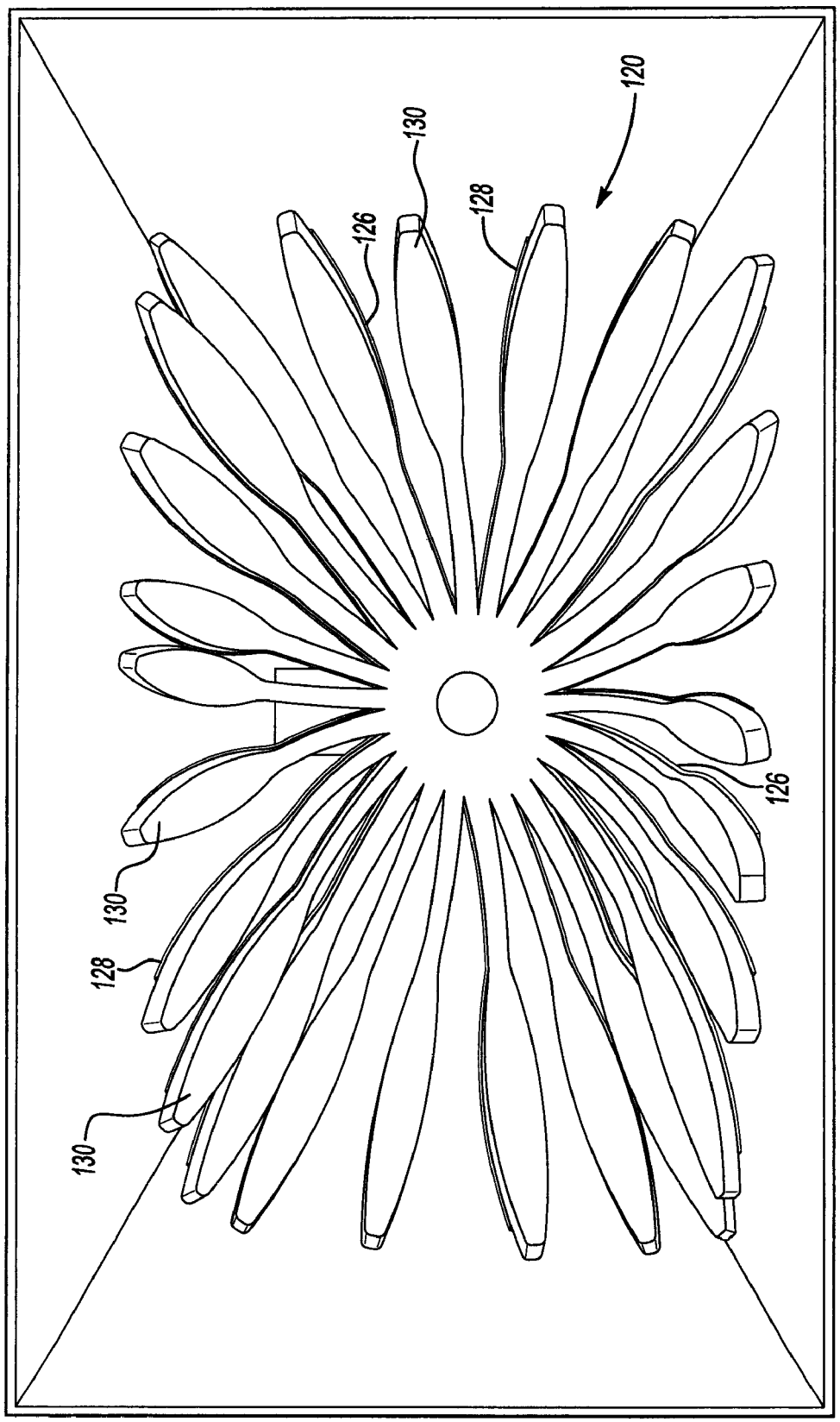

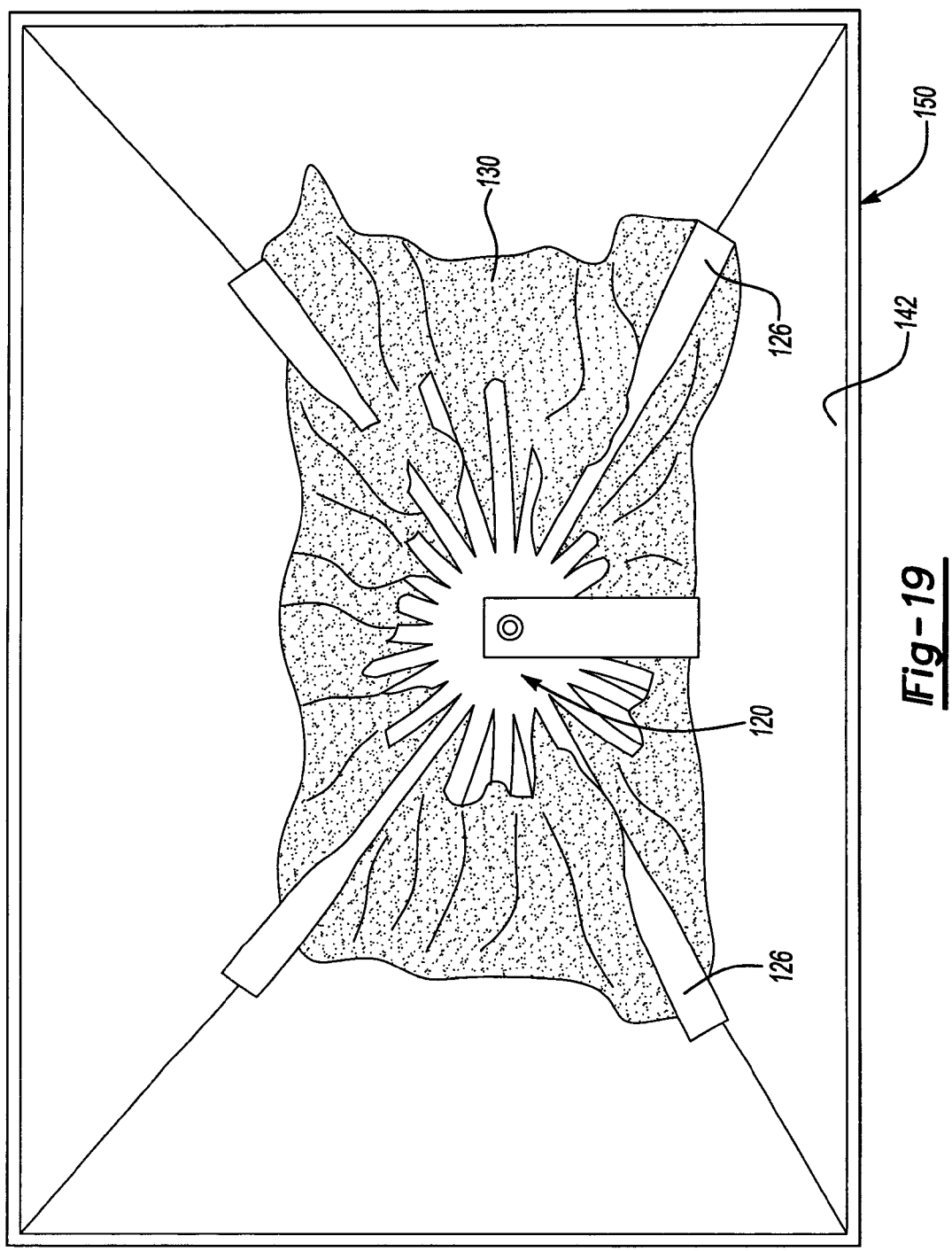

ACOUSTIC BAFFLE ASSEMBLY

CROSS-REFERENCE TO RELATED APPLICATIONS

This application claims the benefit of U.S. Provisional Application Ser. Nos. 61/068,657, filed Mar. 7, 2008 and 61/125,221, filed Apr. 23, 2008 each of which is hereby incorporated herein in their entirety.

BACKGROUND OF THE INVENTION

1. Field of the Invention

The present invention relates generally to a baffle assembly used to seal or baffle a hollow body through the use of a heat activated expandable material.

2. Background Art

Hollow bodies or cavities, such as pillars forming part of the chassis of an automobile, are good transmitters of sound due to their hollow configuration. In operation of an automobile, for instance, the sound generated by the tires, the engine, and/or the transmission can be readily transmitted through the hollow portions of the vehicle, such as A, B and C pillars, and can be audible from within the passenger compartment of the vehicle. This transmission of sound is usually undesirable. To address this problem, manufacturers have placed baffle assemblies within the hollow portions of the vehicle to seal them off. In this way, rather than having a network of tunnels for the transmission of sound throughout the entire chassis of a vehicle, there are a series of sealed compartments which are better able to isolate the sound and reduce its transmission into the passenger compartment.

One way of baffling and/or sealing a hollow compartment, such as an A, B or C pillar of an automobile, is to place a thermally expandable material (sometimes referred to as a "mastic," it being understood that such materials may be either tacky or non-tacky at room temperature) within the hollow compartment and then activate the material by elevating the temperature of the expandable material to its activation temperature. Once activated, the material expands, essentially filling an entire cross-sectional segment of the hollow compartment, thus sealing it.

In a typical application, the mastic is attached to a substrate. The substrate holds the mastic in position within the hollow compartment prior to and during thermal expansion. A mounting member such as a bracket or other fixture connects the substrate to an interior wall of the compartment. In other applications, the mounting member may be separately fabricated and then attached to the substrate.

For cost effectiveness, it is desirable to use mastics having greater expandability because this reduces the amount of mastic material required to seal and/or baffle a hollow compartment. It is also desirable to extrude the mastic material rather than injection mold it because of lower related tooling costs.

Another problem baffle assembly manufacturers face is the need to accommodate differently configured hollow compartments having differently dimensioned cross-sections. It is desirable to have a substrate that can fit in compartments having both large and small cross-sectional dimensions. While the mastic generally expands to fill the compartment that it is mounted in, the substrate, which has a melting point higher then the activation temperature of the mastic, generally remains dimensionally constant. Thus, in instances where the compartment is cross-sectionally smaller than an outer perimeter of the substrate, the substrate generally cannot be used since the substrate will not fit within the component.

Additionally, in some applications, such as automotive applications, the thermal activation of the mastic occurs during a baking process wherein an e-coat or other protective coatings are cured. In such applications, it is necessary that there be clearance between an edge of the substrate and the internal wall of the compartment that is to be sealed and/or baffled. This clearance allows the e-coat to flow past the substrate when the compartment is submerged in the e-coating material. It is therefore desirable to have a substrate that can be used with compartments having both large and small cross-sectional dimensions and that does not obstruct the flow of e-coat materials. The present invention addresses these and other problems.

SUMMARY

Various embodiments of an acoustic baffle assembly for sealing or baffling a hollow body are disclosed herein. In a first embodiment, the acoustic baffle assembly comprises a mass of heat activated expandable material that is capable of activating at a predetermined temperature. A substrate supports the mass. The substrate has a central portion and spaced apart projections extending outwardly from the central portion. In this first embodiment, the projections are configured to control expansion of the mass.

In an implementation of the first embodiment, the substrate has a first side and a second side. The mass is disposed on the first side. The projections are configured to guide expansion of the mass away from the second side.

In another implementation of the first embodiment, prior to expansion, substantially the entire mass is supported on the central portion.

In another implementation of the first embodiment, prior to expansion, a first portion of the mass is supported on the central portion and a second portion of the mass is supported on the projections.

In another implementation of the first embodiment, prior to expansion, a portion of the mass is supported on the projections and a portion of the mass extends beyond an outer end of at least one of the projections.

In a second embodiment, the acoustic baffle assembly comprises a mass of heat activated expandable material capable of activating at a predetermined temperature. The mass defines a first perimeter. A substrate supports the mass. The substrate has a central portion and fingers projecting outwardly from the central portion. An outer end of each of the fingers defines a second perimeter. The second perimeter is larger than the first perimeter. In this second embodiment, the mass of heat activated expandable material is disposed on the substrate such that a substantial portion of the first perimeter falls within the second perimeter and the fingers are configured to control expansion of the mass.

In an implementation of the second embodiment, each of the fingers is at least partially coplanar with the central portion.

In another implementation of the second embodiment, a notch is defined in one of the central portion and the fingers to permit flexure of the fingers.

In another implementation of the second embodiment, the substrate comprises a generally planar polyamide material.

In another implementation of the second embodiment, the mass expands by at least 1,000% when activated.

In another implementation of the second embodiment, the fingers are generally coplanar with the central portion and project outwardly from the central portion at an angle other than 90°.

In another implementation of the second embodiment, each finger is substantially aligned with at least one neighboring finger.

In another implementation of the second embodiment, the fingers are configured to cooperate with each other to control expansion of the mass in a desired direction.

In a third embodiment, the acoustic baffle assembly comprises a mass of heat activated expandable material that is capable of activating at a first predetermined temperature. A substrate supports the mass. The substrate has a central portion and flexible elongate arms extending outwardly from the central portion. A band is disposed around the flexible elongate arms. The band flexes elongate arms in an axial direction with respect to the central portion and restrains the flexible elongate arms in a first configuration. The band has a melting point of a second predetermined temperature that is lower than the first predetermined temperature. In this third embodiment, the flexible elongate arms are configured to move outwardly from the first configuration when the band sufficiently melts.

In an implementation of the third embodiment, an outer tip of each of the elongate arms comprises a generally circular perimeter.

In another implementation of the third embodiment, the flexible elongate arms are biased to move outwardly from the first configuration when the band sufficiently melts.

In another implementation of the third embodiment, the mass extends beyond an outer tip of at least one of the flexible elongate arms.

In another implementation of the third embodiment, at least a portion of each of the flexible elongate arms is generally coplanar with the central portion.

In another implementation of the third embodiment, the flexible elongate arms each have a proximal end that is adjacent the central portion and a distal end that is remote from the central portion and wherein a width of at least one of the flexible elongate arms generally increases from the proximal end to the distal end.

In another implementation of the third embodiment, the flexible elongate arms are configured to cooperate with each other to control expansion of the mass in a desired direction.

BRIEF DESCRIPTION OF THE DRAWINGS

The description herein makes reference to the accompanying drawings wherein like reference numerals refer to like parts throughout the several views, and in which:

FIG. 16 is a perspective, cross-sectional view taken from a position above a hollow body having the acoustic baffle assembly of FIG. 14 mounted therein;

FIGS. 18 and 19 are perspective cross-sectional views of the hollow bodies of FIGS. 16 and 17, respectively subsequent to the expansion of a heat activated expandable mass.

DETAILED DESCRIPTION OF THE PREFERRED EMBODIMENT(S)

Figure 1:
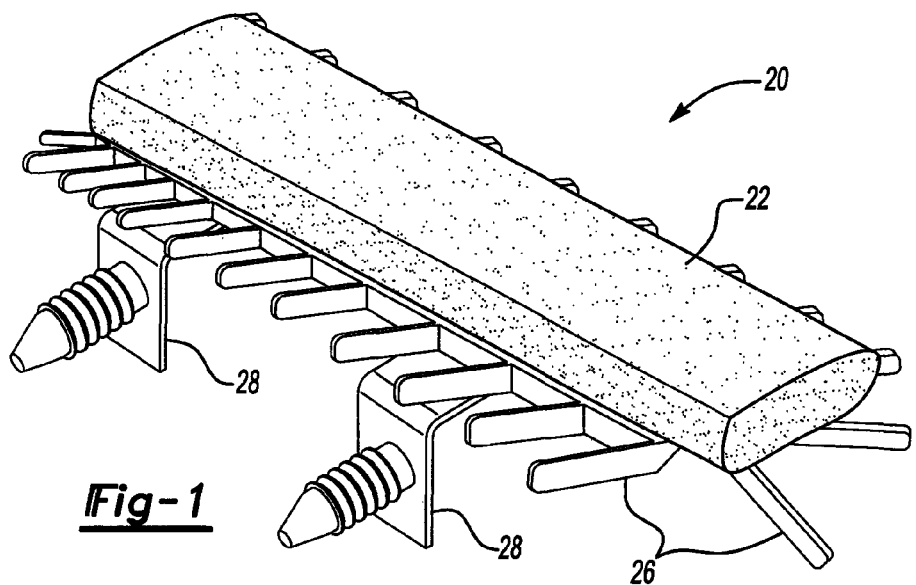
FIG. 1 is a perspective view illustrating a first embodiment of an exemplary acoustic baffle assembly made in accordance with the teachings of the present invention.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

The present invention discloses a baffle assembly for sealing or baffling a hollow body. Although the following description centers around an automotive application of this invention, it should be understood that the teachings of the present invention are compatible with any application wherein it is desirable to seal hollow compartments such as, but without limitation, ducts and conduits. A common use for the baffle assembly of the present invention is to seal A, B and/or C pillars of an automobile. As is well known, the A pillar of an automobile is the pillar which separates the windshield from a forward side window of the vehicle, the B pillar separates the forward side window from the rear side window and the C pillar separates the rear side window from the rear window. A, B and C pillars are hollow structural components of the vehicle which are connected to other hollow structural components of the chassis and which, if not baffled, can be likely to transmit undesirable sounds from the tires, the engine, the transmission and elsewhere into the passenger compartment of the vehicle.

Vehicle chassis, such as unibodies, typically undergo a variety of manufacturing processes to protect against corrosion. In a typical case, the metal of the chassis is washed to remove oil and other debris using a phosphate cleaner. Another cleaner is then used to remove the phosphate. Next, an e-coat is applied to the chassis. The e-coat is then baked to cure it. A paint primer is then applied to the chassis which is then baked again to cure the primer. Next, a base coat of paint is applied to the chassis and again baked until cured. Lastly, a clear coat is applied to the chassis over the paint. The application of the e-coat entails submerging the chassis within a container of liquid coating to coat all surfaces of the chassis, both inside and outside. The chassis is then removed from the container and the coating is allowed to drain out of the chassis. After the e-coating is applied, the entire chassis is baked at approximately 350° F.±50° F. for anywhere from 20 minutes to 60 minutes.

In conventional applications, baffle assemblies having a thermally expandable mastic are mounted inside the cavity of the A, B and C pillars. The thermally expandable material may comprise an ethylene copolymer as a base polymer. In some embodiments, the material comprises ethylene vinyl acetate (EVA) copolymer or an EVA copolymer derivative. Developed over many years, the mastic, which originally expanded to 100% or 200% of its inactivated volume, is now capable of expanding over 2000%. When the temperature of the mastic reaches a predetermined elevated temperature, the mastic activates and expands. Depending on the formulation of the mastic used, the expansion of the mastic can be anywhere from 1500% to 2800% (and beyond) volumetric expansion. In the typical application, the heating of the chassis during the curing of the e-coating elevates the temperature of the mastic to the activation temperature. Thus, in the typical application, the mastic of the baffle assembly expands as the e-coat is cured. The mastic material, when expanded, is capable of bonding to both the bare metal of the chassis and to the cured e-coat.

Figure 2:
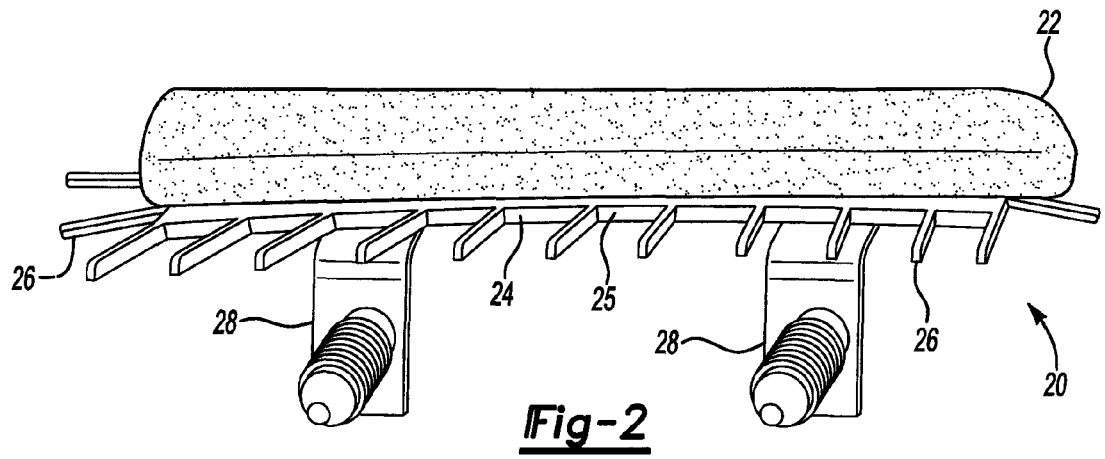
FIG. 2 is a perspective view illustrating a side portion of the acoustic baffle assembly of FIG. 1.
Figure 3:
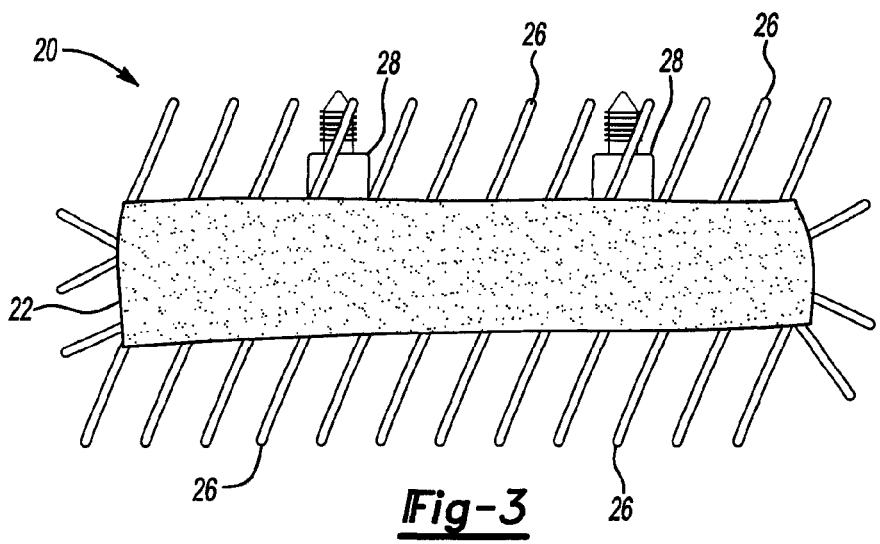
FIG. 3 illustrates a plan view of the acoustic baffle assembly of FIG. 1.

With reference to FIGS. 1-3, these figures illustrate three differing views of a first embodiment of the present invention. As depicted, a baffle assembly 20 includes an expandable mass 22, typically a mastic, capable of expanding approximately 2000% volumetrically when activated. Any suitable mastic or expandable material can be used. In at least one embodiment, the expandable material can, upon exposure to sufficient heat, expand approximately 2000% volumetrically; in other embodiments, the expandable material may expand by approximately 500% to 3000% volumetrically. In the illustrated embodiment, the mastic is comprised of an ethylene vinyl acetate copolymer. Derivatives thereof and/or other thermoplastics (including thermoplastic elastomers) may also be used. Typically, the mastic may also contain one or more heat activatable blowing agents, in particular one or more latent chemical blowing agents, in amounts effective to provide the desired degree of expansion when the mastic is heated. Additional ingredients that may also be present in the mastic include, but are not limited to, crosslinking agents, curatives, fillers, plasticizers, tackifiers, stabilizers/anti-oxidants, coupling agents, colorants, rubbers/elastomers, and the like. The mastic may remain thermoplastic after being activated or, in a preferred embodiment, may be formulated such that it undergoes curing or crosslinking when heated such that the resulting foam is crosslinked or thermoset in character (thereby having greater strength and/or heat resistance and/or other improved properties as compared to an analogous thermoplastic system). Heat activated expandable materials are well known in the art and are described, for example, in the following published applications and patents, each of which is incorporated herein by reference in its entirety: U.S. Pat. Nos. 6,150,428; 5,708,042; 5,631,304; 6,830,799; 6,281,260; 5,266,133; 5,573,027; 5,160,465; 5,385,951; 7,247,657; 7,140,668; and 7,199,165; U.S. Patent Publication No. 2004-0266898; and PCT Publication Nos. WO 2008/021200; WO 2007/0276054; WO 2007/117663; WO 2007/117664; and WO 2007/012048.

Depending on its composition, mastic 22 may activate at temperatures as low as 250° as high as 450°. Accordingly, mastic 22 activates during typical paint shop and e-coat baking temperatures and durations.

Baffle assembly 20 may have any desirable length. For example, for universal applications, lengths ranging from 2 to 8 inches may be appropriate. Alternatively, ranges of 3 to 7 inches may be appropriate. In some embodiments, lengths may be 3 inches, 5 inches, or 7 inches. Widths may range from 2 inches to 4 inches. The expandable mass 22 may have a mass ranging from 0.01 kilograms-0.05 kilograms. The mass of the entire baffle assembly 20 may range from 0.02 kilograms to 0.10 kilograms.

Baffle assembly 20 includes a substrate 24. Substrate 24 serves as a platform to support mass 22 within the hollow portion of a compartment. The expandable mass 22 may be attached to substrate 24 using any conventional method including staples, rivets, wires, adhesives, and mechanical interlockings to name just a few. In some embodiments, expandable mass 22 may have characteristics of a pressure sensitive adhesive and be sufficiently tacky to stick to the substrate without the need for mechanical fasteners. In other embodiments, expandable mass 22 may have characteristics of a hot melt adhesive wherein the mastic is heated and applied to the substrate surface while in a liquid or softened state and remains adhered to the substrate surface upon cooling and resolidifying.

The substrate 24 can be made of any suitable material, and by any suitable process. In at least certain embodiments, the substrate 24 is made of at least one dimensionally heat stable thermoplastic polymer. In at least one embodiment, substrate 24 is a nylon material. In other embodiments, any polyamide material, such as aramid and sodium polyaspartate, may be employed. In other embodiments, substrate 24 may be any heat resistant thermoplastic, thermoset, or metallic material. In still other embodiments, any other material may be employed providing that such other material has a melting point above that of expandable mass 22 and, preferably, above the temperature at which the chassis is bake during e-coat curing.

Substrate 24 includes a central portion 25 and a plurality of fingers 26 projecting outwardly from central portion 25 and substantially coplanar therewith. In the illustrated embodiment, central portion 25 is substantially rectangular, having two relatively long sides and two relatively short sides. In the illustrated embodiment, fingers 26 project outwardly from all four of the perimeter sides of central portion 25, however, it should be understood that the fingers could project from less than four perimeter sides. The fingers 26 projecting outwardly from the long sides of central portion 25 are aligned with one another and project outwardly at an angle other then 90°. In other embodiments, fingers 26 may project outwardly at 90°. The fingers 26 projecting outwardly from the short ends of central portion 25 are transverse to one another. In other embodiments, fingers 26 projecting outwardly from the short ends of central portion 25 may be aligned with one another and may project outwardly at either a 90° angle or at angle other then 90°. In other embodiments, fingers 26 may project outwardly at between approximately 60° to 80°. In still other embodiments, fingers 26 may project outwardly at between approximately 65° to 75°.

Fingers 26 may have any desirable length. In some embodiments, fingers ranging from 15 mm to 50 mm in length are desirable. In other embodiments, fingers from 20 mm to 40 mm in length may be desirable. In still other embodiments, fingers ranging from 25 mm to 35 mm in length may be desirable. In some embodiments, the spacing between individual fingers 26 may range from 7 mm to 13 mm. In other embodiments, the spacing between individual fingers 26 may range from 8 mm to 12 mm. In other embodiments, the spacing between individual fingers 26 may be from 9 mm to 11 mm. In still other embodiments, individual fingers 26 may be spaced apart by 10 mm. Each individual finger 26 may have a thickness ranging from 0.5 mm to 1.5 mm and a width ranging from 0.5 mm to 3.0 mm. Moreover, while the fingers 26 are shown to be relatively uniform in size and shape, it should be understood that at least some of the fingers 26 can vary in size and/or shape from other of the fingers 26.

In other embodiments, fingers 26 may be curved or may angle upwards or downwards with respect to central portion 25. In still other embodiments, fingers 26 may not be uniform in width. Rather, for example, each of the fingers 26 may have a width at its tip that is greater than a width at its base where each finger 26 meets central portion 25.

In still other embodiments, the cross-sectional shape of the fingers may be square, round, rectangular, triangular, oval or any other suitable geometry. The surface of the fingers on the same side of the substrate as the surface to which the mass of heat activated expandable material is affixed may be flat or may be V-shaped, grooved, concave, or otherwise contain recesses that may assist in supporting and guiding the material as it is being softened and expanded.

In applications where the cavity to be sealed is smaller than an outer perimeter formed by the collective ends of fingers 26, baffle assembly 20 need not be trimmed to size. This is because fingers 26 have been mounted at an angle with respect to central portion 25 and have the ability to flex. Fingers 26 may flex in the direction they are leaning towards to allow baffle assembly 20 to be mounted inside of a cramped compartment. In some embodiments, at the base of each finger 26 where it adjoins central portion 25, a notch may be carved out to further facilitate the flexing of fingers 26. This capability can save considerable cost. For instance, the dimensions of A, B, and C pillars of a vehicle may change when the vehicle goes from prototype to production. If the compartments within the A, B, and C pillars are made smaller, ordinarily, baffle assembly manufactures would need to redesign the baffle assemblies including the substrates to accommodate the smaller environment. Baffle assembly 20 having fingers 26 will, in many cases, obviate the need to redesign and, consequently, save considerable cost by avoiding the need to retool or procure new tools to produce the redesigned baffle assembly.

Fingers 26 have another advantage in cramped quarters. Fingers 26 allow e-coating and other coating to flow past baffle assembly 20 when the chassis is submerged in the coating. If substrate 24 were a solid rectangular substrate having an outer perimeter coinciding with the outer perimeter formed by the ends of fingers 26, then mounting such a substrate in close proximity to a wall of the chamber could obstruct and impede the flow of the coating.

Figure 4:
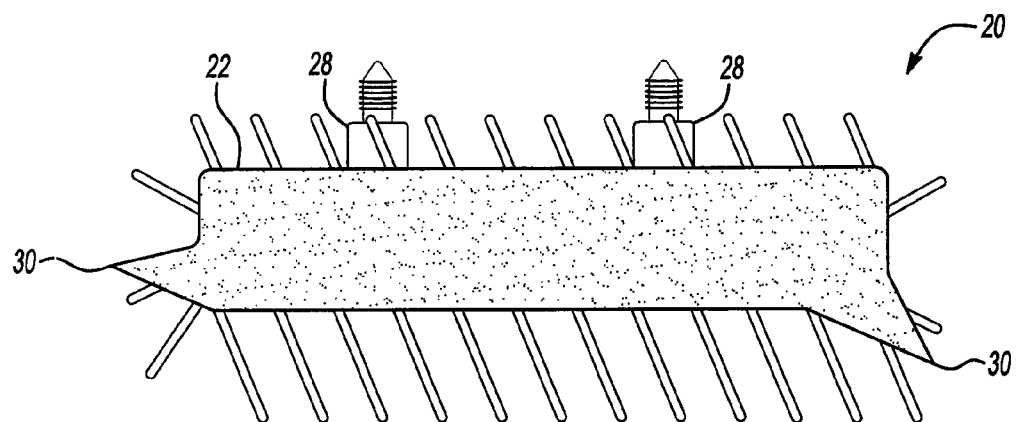
FIG. 4 is a plan view illustrating an alternate implementation of the acoustic baffle assembly of FIG. 1.
Figure 12:
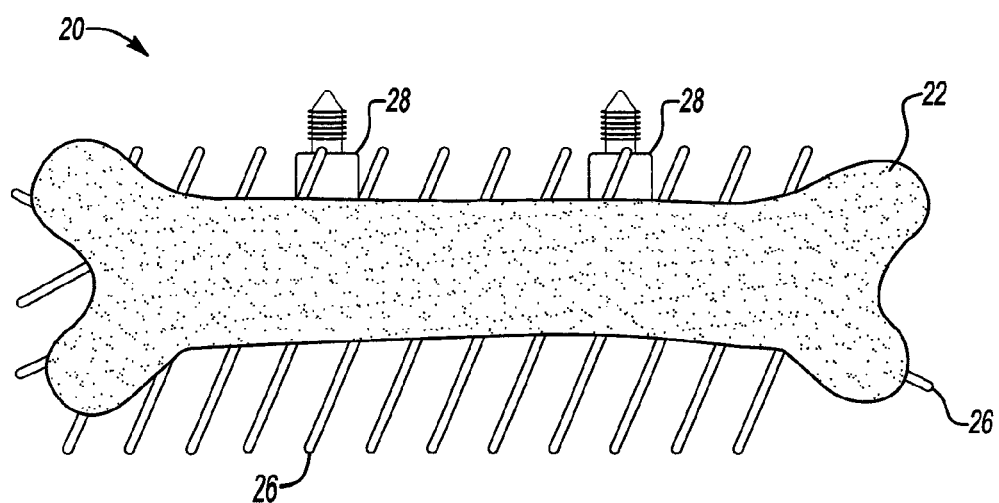
FIGS. 12-13 illustrate alternate implementations of the acoustic baffle assembly of FIG. 1 having differently shaped, die cut expandable masses.
Figure 13:
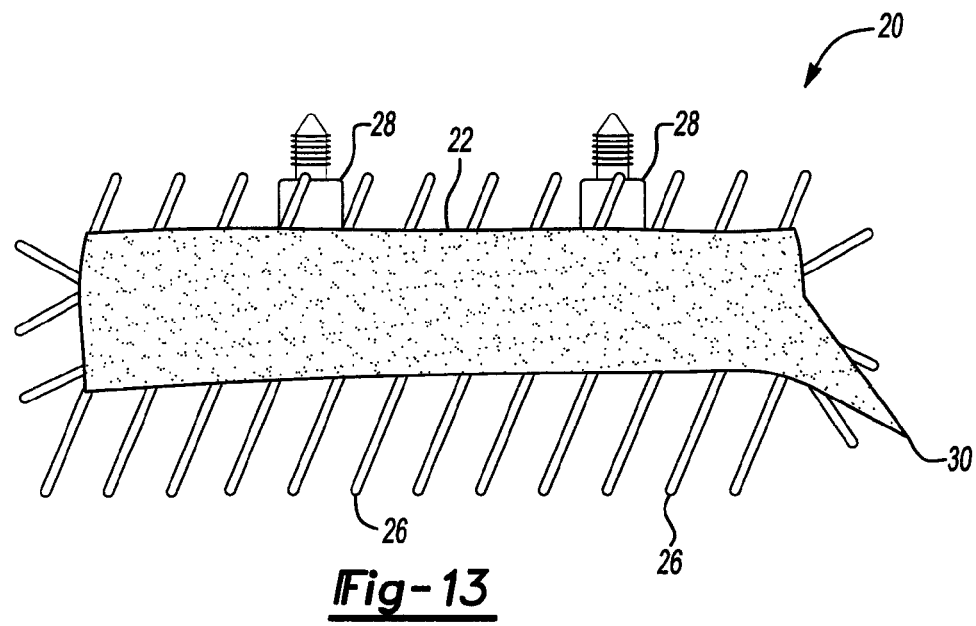

Expandable mass 22 may be extruded and then cut to fit on substrate 24. Alternatively, expandable mass 22 may be injection molded or, as illustrated in FIGS. 4, 12, and 13, mass 22 may be die cut. Substrate 24 may be injection molded, die cut, or cut from a sheet of polyamide material such as by use of a water jet or by any other means. Where the mass and the substrate are both capable of being molded, they may be advantageously assembled using co-molding or over molding techniques.

In the depicted illustrations of the first embodiment (FIGS. 1-13) central portion 25 is a solid planar member having a perimeter that is generally the same as a perimeter formed by an outer edge of expandable mass 22. In other embodiments, the respective perimeters of expandable mass 22 and central portion 25 may not be co-extensive. In still other embodiments, central portion 25 may not be solid. Instead, central portion 25 may comprise a lattice or grid or net or mesh or other similar configuration.

Figure 9:
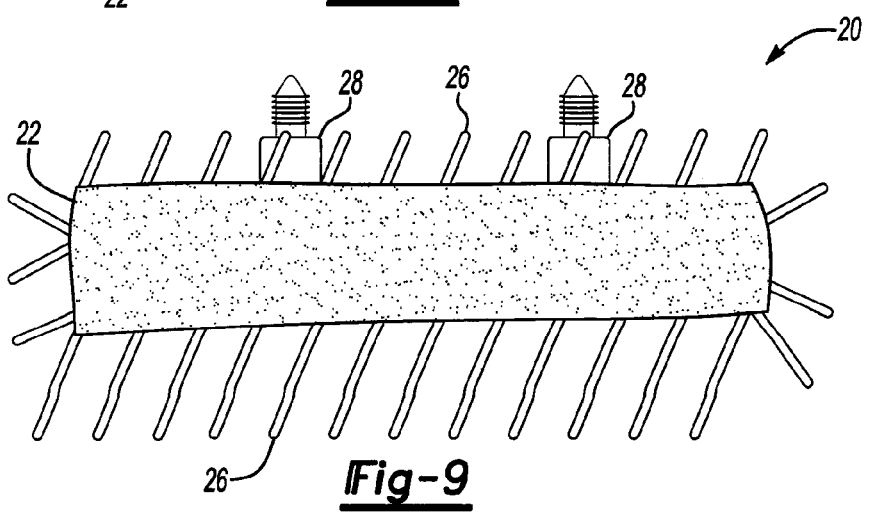
FIG. 9 is a plan view illustrating an alternate implementation of the acoustic baffle assembly of FIG. 1 wherein fingers having differing lengths project from a central portion of a substrate have differing lengths.
Figure 10:
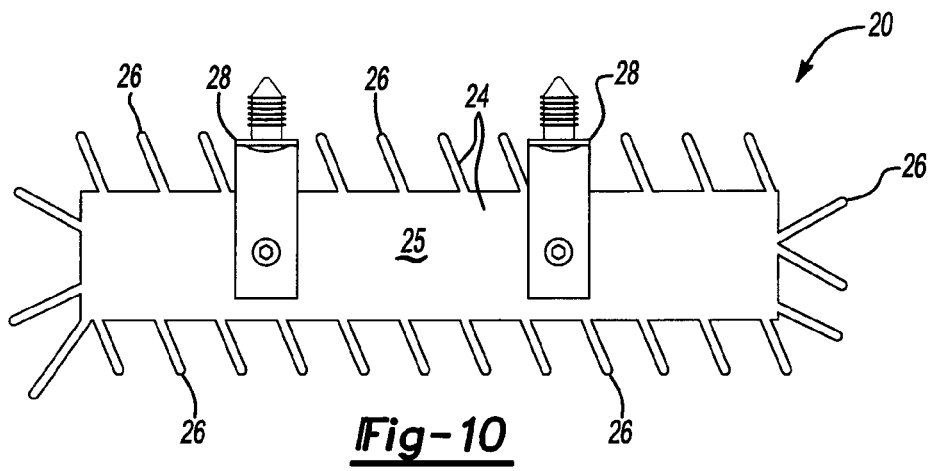
FIG. 10 is a plan view illustrating an underside of the acoustic baffle assembly of FIG. 9.

Baffle assembly 20 further comprises mounting members 28. In the depicted embodiment, mounting members 28 are steel brackets having nylon fasteners which are configured to fit in openings in a wall 34 of the compartment 38 that is to be sealed. As best seen in FIG. 10, mounting members 28 are attached to substrate 24 by rivets. In other embodiments, threaded steel fasteners may be used to secure mounting members 28 to an internal wall of the compartment to be sealed. In some applications, the mounting member may be integral with the substrate. For example, the mounting member(s) and substrate may be integrally formed from a thermoplastic such as a polyamide using injection molding. As illustrated in FIG. 2, mounting members 28 extend transversely from substrate 24 a length sufficient to permit baffle assembly 20 to be mounted to an internal wall of a compartment without the ends of fingers 26 physically contacting the wall. In some embodiments, the length of mounting member 28 may range from 5 cm to 15 cm. In other embodiments, the length of mounting members 28 may vary, as illustrated in FIG. 9. By varying the length of mounting members 28, baffle assembly 20 can be placed as close to the center of the compartment to be sealed as desired or as close to an internal wall of the compartment as desired.

When baffle assembly 20 is placed inside a hollow chamber or compartment, such as an A, B or C pillar of a vehicle, and then heated to the activation temperature, expandable mass 22 activates. At first, expandable mass 22 softens and begins to flow. Substrate 24 will generally be mounted such that expandable mass 22 is above, and supported by, substrate 24. If substrate 24 lacked fingers 26, expandable mass 22 would flow over the outer edges of central portion 25 and drip down below substrate 24. This condition would be unacceptable because expandable mass 22 could then expand in an uncontrolled manner and may fail to adequately seal a cross-sectional segment of the compartment. Fingers 26 prevent this by serving as a platform to support the softened, flowing expandable mass, such as mastic, prior to its expansion. Fingers 26 continue to support mass 22 during its expansion, thus controlling and directing the expansion of mass 22 and ensuring a good seal of the compartment. If fingers 26 are spaced too far apart, mass 22 may flow between fingers 26 and sag downwardly or drip which would be undesirable. As fingers 26 are moved closer together, the ability of mass 22 to flow in between the individual fingers as it softens diminishes. Therefore, an appropriate distance between fingers 26 will vary from embodiment to embodiment depending on the formulation of mass 22. In the some embodiments, a maximum distance between fingers of approximately 10 mm is appropriate. In other embodiments, a distance of between approximately 8 mm and 12 mm may generally be acceptable. As the viscosity of a heated, softened, mass 22 increases, the distance between fingers 26 may also increase. Conversely, as the viscosity diminishes, the maximum acceptable distance between fingers correspondingly diminishes.

Figure 5:
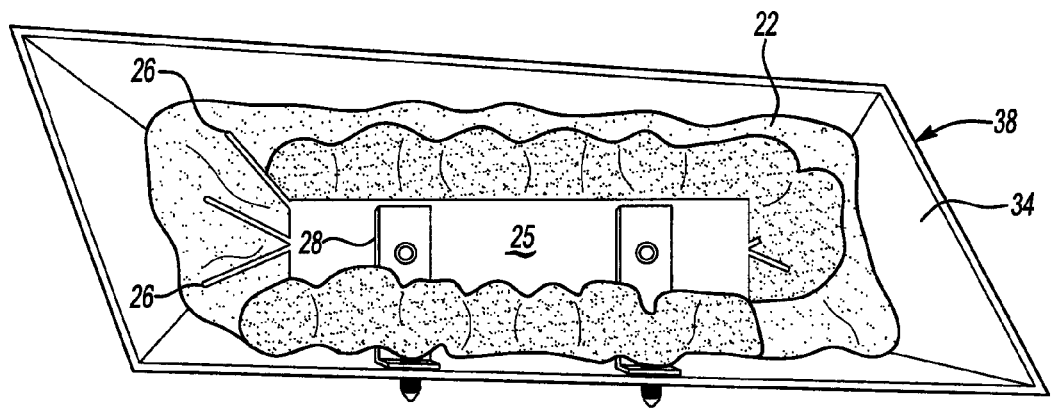
FIGS. 5-6 are cross-sectional views taken from a position below a hollow body equipped with an implementation of an exemplary acoustic baffle assembly made in accordance with the teachings of the present invention subsequent to activation of the expandable material.
Figure 6:
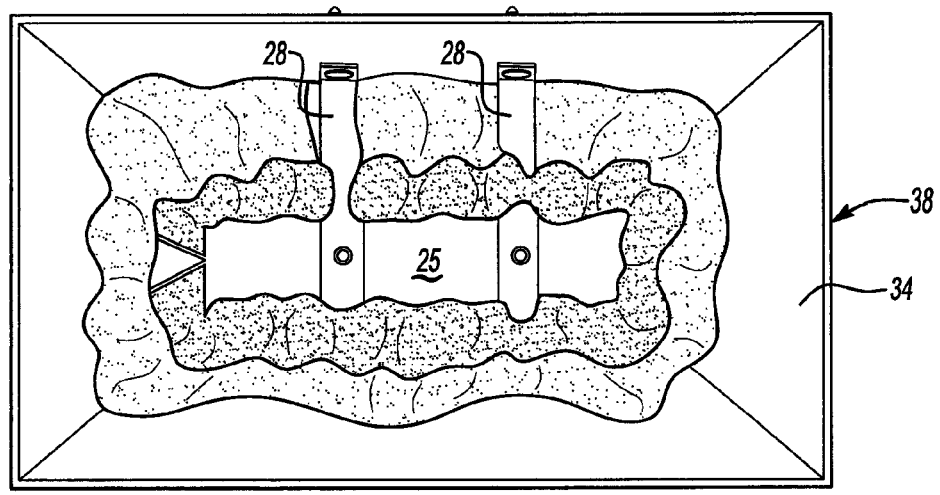
Figure 7:
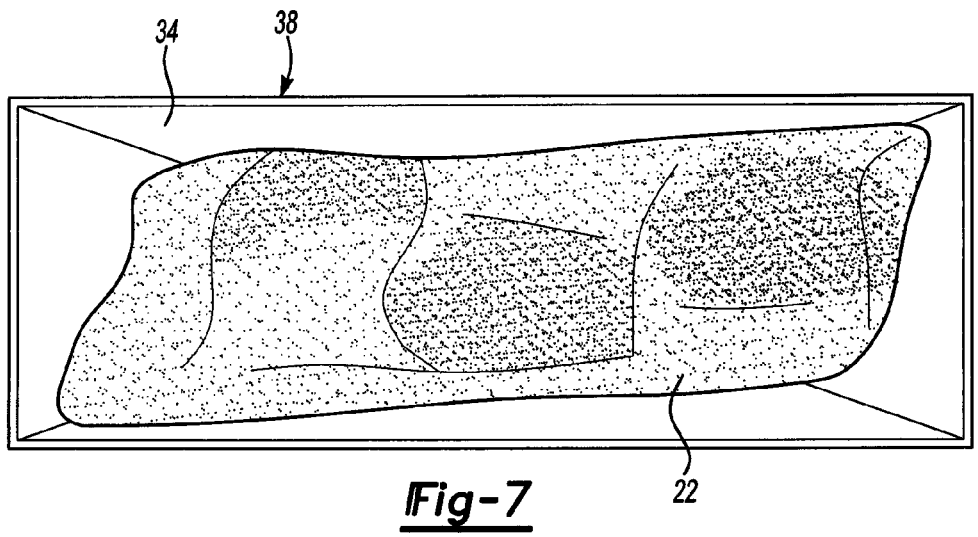
FIGS. 7-8 are cross-sectional views taken from a position above the hollow bodies of FIGS. 5 and 6, respectively.
Figure 8:
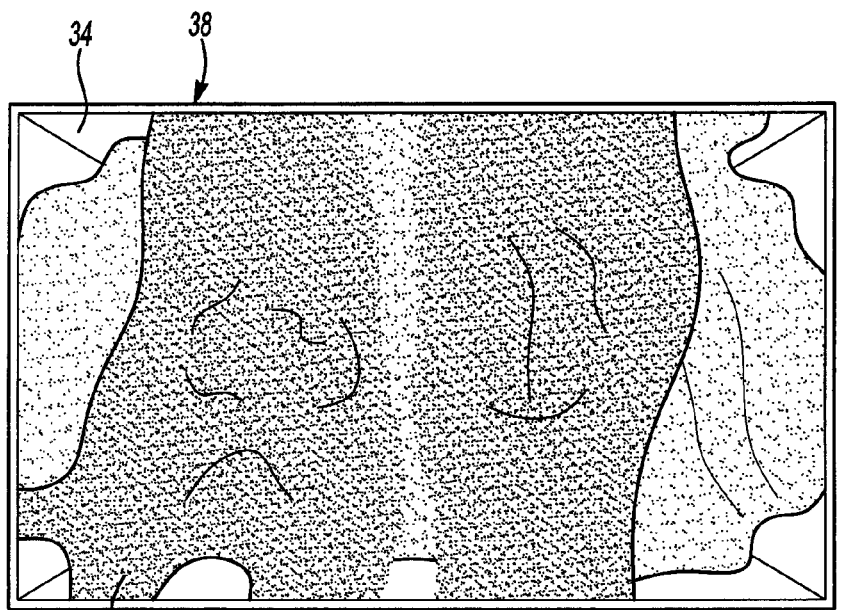

As mass 22 is thermally activated, it expands in an outward and upward direction. Mass 22 will bond with the internal walls of the compartment as it expands and contacts them. This creates an hermetic seal and acoustic barrier that not only inhibits the transmission of sound through the vehicle's chassis, but also inhibits the flow of water, dust and other particulates through the chassis. Illustrations depicting an exemplary segment of a compartment subsequent to the thermal expansion of mass 22 are shown in FIGS. 5-8. These figures depict how expanded mass 22 expands to fill an entire cross-section of the cavity. FIGS. 5 and 6 depict an underside of baffle assembly 20. In this view, substrate 24 is visible together with mounting members 28 supporting substrate 24 to internal wall of the compartment. FIGS. 5 and 6 illustrate mounting members 28 having differing lengths to accommodate compartments having different cross-sectional dimensions. FIGS. 7-8 depict the opposite sides of the respective compartments showing the region above substrate 24 subsequent to activation of mass 22.

In some embodiments, for optimal expansion, it may be desirable to have mass 22 in close proximity to the wall of the chamber to which baffle assembly 20 is attached. In such instances, fingers 26 may have a shorter length on the side of central portion 25 where mounting members 28 connect with the wall than the length of Fingers 26 on the opposite side of central portion 25. In other embodiments, all of the Fingers 26 may have substantially the same length and mass 22 may be disposed so as to be at least partially supported by the Fingers 26 that face the wall.

Die cutting may be desirable in applications where the cross-sectional configuration of the compartment is irregular. It may be advantageous to configure mass 22 to have a shape that conforms to the cross-section. Die cutting mass 22 facilitates this. With respect to FIG. 4, mass 22 has been die cut. Mass 22 has mass projections 30 which project outwardly from mass 22. Mass projections 30 correspond to contours of the compartment which baffle assembly 20 will be sealing. This ensures that there will be sufficient expandable mass, such as mastic material, in the vicinity of crevices and other irregular surface features to completely fill those features in sealed compartments. FIGS. 9 and 10 depict a baffle assembly 20 from above and below respectively. In these figures, it can be clearly seen that the fingers projecting from central portion 25 on the side where mounting members 28 connects to the internal surface of the compartment are shorter then the fingers 26 projecting from the opposite side of central portion 25. Additionally, in FIG. 6, the underside of substrate 24 is clearly visible. Here it can also be seen that central portion 25 is a generally rectangular planar member.

Figure 11:
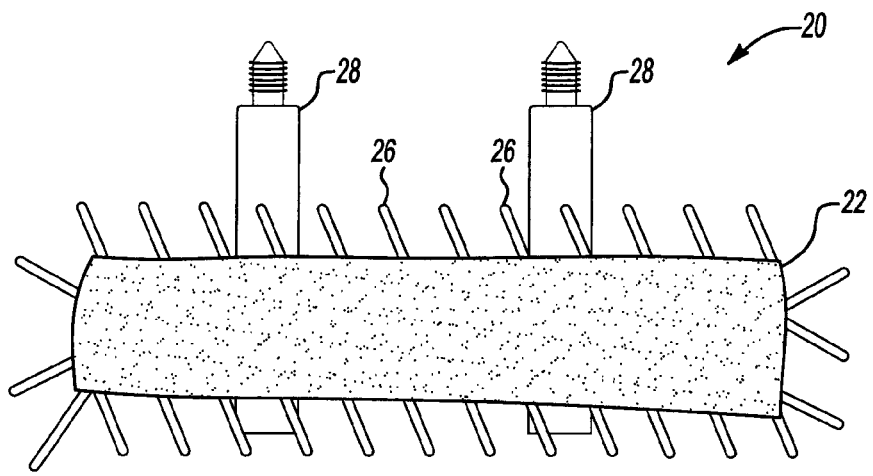
FIG. 11 is a plan view illustrating an alternate implementation of the acoustic baffle assembly of FIG. 1 having elongate mounting members.

With respect to FIG. 11, mounting members 28 have a greater length than the mounting members 28 depicted in FIG. 9 and are configured to dispose baffle assembly 20 in the center of a compartment having a relatively large width. In this embodiment, fingers 26 are substantially the same length on both the side of substrate 24 facing the mounting wall and the side of substrate 24 facing away from the mounting wall. In this embodiment, mass 22 is substantially centered on substrate 24. A perimeter formed by the outer edges of mass 22 fits substantially entirely within a perimeter formed by the outer ends of fingers 26. FIG. 11 also illustrates notches cut into fingers 26 at the location where fingers 26 contact substrate 24. In all of the implementations of the first embodiment illustrated in FIGS. 1-13, fingers 26 are integral with substrate 24. In other embodiments, substrate 24 and fingers 26 may be separately fabricated and attached. In other embodiments, fingers 26 may not be aligned with one another but rather may be transverse angles with respect to one another forming a lattice or grid.

FIGS. 12 and 13 illustrate additional embodiments of baffle assembly 20 wherein expandable mass 22 is die cut rather than extruded and is configured to correspond to the internal configuration of the compartment which baffle assembly 20 is to seal.

Figure 14:
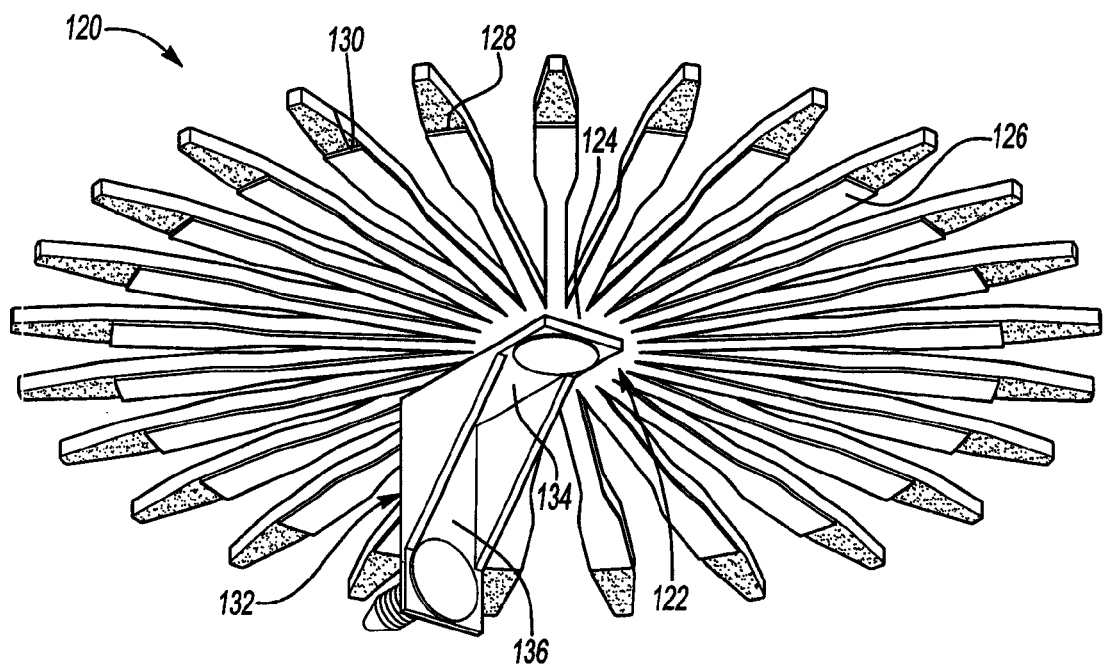
FIG. 14 is a perspective view illustrating a second embodiment of an exemplary acoustic baffle assembly made in accordance with the teachings of the present invention.

With reference to FIG. 14, a second embodiment of an acoustic baffle assembly 120 made in accordance with the teachings of the present invention is illustrated. Acoustic baffle assembly 120 includes a substrate 122 having a central portion 124 and a plurality of elongate arms 126. In the illustrated embodiment, elongate arms 126 include outer tips 128 such that the outer tips 128 cooperate together to form a generally circular perimeter. In other embodiments, the individual arms may have varying lengths such that only some of the tips may cooperate to form the generally circular perimeter. In still other embodiments, other geometric configurations may be employed. For instance, the cross sectional configuration of the compartment may be more suited to oval or oblong substrate configurations. In the illustrated embodiment, each elongate arm 126 has substantially the same length and configuration. In other embodiments, elongate arms 126 of varying lengths may be employed. Also, in the illustrated embodiment, an outer portion of each elongate arm 126 flares outwardly and is generally wider than an inner portion of each respective elongate arm 126. In other embodiments, other configurations may be employed. For instance, an outer portion of each elongate arm 126 may have substantially the same width as the inner portion. In other embodiments, elongate arms 126 may taper towards the outer portion.

Elongate arms 126 are flexible and can bend in directions that are transverse to the plane of central portion 124. In some embodiments, elongate arms 126 may be flexible enough to bend ±90° from a relaxed state. In other embodiments, elongate arms 126 may be flexible enough to bend ±135° from a relaxed state. In still other embodiments, elongate arms 126 may be flexible enough to bend ±180° from a relaxed state. In this manner, each elongate arm 126 may act as a spring, returning to a position that is substantially coplanar with central portion 124 once a bending force or other restraint or obstruction that restrains elongate arms 126 in a bent position is removed or released. Substrate 122 may be made of any suitable material including plastics such as, but not limited to, nylon, polyester, EVA, cross-linked polyethylene, polypropylene, TPE (thermoplastic elastomer), TPO (thermoplastic olefin), TPV (thermoplastic vulcanite), polyurethane, epoxy, rubber (epdm, sbr, natural rubber, neoprene, reclaim, silicon), PVC, acrylic, polycarbonate, polystyrene, PET, and polylactic acid. Substrate 122 could alternatively be made of metals including spring steel and aluminum. It should be understood that materials deemed suitable for substrate 122 can also be suitable for substrate 24 and vice versa.

A mass of heat activated expandable material 130 is supportable on substrate 122. Expandable mass 130 is typically a mastic that is capable of expanding from 500% to 2,000% and beyond, volumetrically, when activated. Any suitable mastic or expandable material can be used. In at least one embodiment, the expandable material can, upon exposure to sufficient heat, expand approximately 2,000% volumetrically; in other embodiments, approximately 500% to 3,000% volumetrically. In the illustrated embodiment, the mastic is comprised of an ethylene vinyl acetate copolymer. Derivatives thereof and/or other thermoplastics (including thermoplastic elastomers) may also be used. In one embodiment, the mastic is capable of being crosslinked or cured when heated, e.g. through the incorporation of reactive polymers, reactive oligomers, reactive monomers, crosslinking agents and/or curing agents and the like. It should be understood that materials suitable for expandable mass 130 can also be suitable for expandable mass 22, and vice versa.

In the depicted embodiments, expandable mass 130 is a single, integral mass having a periphery that is substantially the same as the periphery of substrate 122. In other embodiments, a plurality of masses 130 may be supported on substrate 122. The plurality of masses 130 may, when taken together, define a periphery substantially the same as a periphery of substrate 122. In other embodiments, the plurality of masses 130 may be supported by only elongate arms 126. In still other embodiments, a single mass 130 or a plurality of masses 130 may be supported on only central portion 124.

Typically, the mastic may also contain one or more heat activatable blowing agents, in particular one or more latent chemical blowing agents, in amounts effective to provide the desired degree of expansion when the mastic is heated. Additional ingredients that may also be present in the mastic include, but are not limited to, crosslinking agents, curatives, fillers, plasticizers, tackifiers, stabilizers/anti-oxidants, coupling agents, colorants, rubbers/elastomers, and the like. The mastic may remain thermoplastic after being activated or, in a preferred embodiment, may be formulated such that it undergoes curing or crosslinking when heated such that the resulting foam is crosslinked or thermoset in character (thereby having greater strength and/or heat resistance and/or other improved properties as compared to an analogous thermoplastic system).

Heat activated expandable materials are well-known in the art and are described, for example, in the following published applications and patents, each of which is incorporated herein by reference in its entirety: U.S. Pat. Nos. 6,150,428; 5,708,042; 5,631,304; 6,830,799; 6,281,260; 5,266,133; 5,573,027; 5,160,465; 5,385,951; 7,247,657; 7,140,668; and 7,199,165; U.S. Patent Publication Nos. 2004/0266898; and PCT Publication Nos. WO 2008/021200; WO 2007/0276054; WO 2007/117663; WO 2007/117664; and WO 2007/012048.

Depending on its composition, mass 130 may activate at temperatures as low as 250° F. and as high as 450° F. Accordingly, mass 130 activates during typical paint shop and e-coat baking temperatures and durations. In some embodiments, mass 130 may be co-injection molded together with substrate 122. In such embodiments, mass 130 may soften and become liquified during the co-injection process such that mass 130 becomes heat bonded to substrate 122, forming a relatively robust bond with substrate 122 as mass 130 cools and solidifies. In other embodiments, mass 130 may be overmolded over substrate 122. In other embodiments, mass 130 may be die cut and disposed over substrate 122 and affixed thereto by any suitable means including heat staking, adhesives, and mechanical fasteners. In other embodiments, mass 130 may be extruded and affixed to substrate 122 in any manner described above.

Mass 122 is a substantially flexible material that bends together with the elongate arms 126 of substrate 122 and deforms without substantially separating from elongate arms 126. In some embodiments, mass 130 extends beyond tips 128 and are supported in cantilever fashion. Such a configuration is illustrated in FIG. 14.

A mounting assembly 132 supports substrate 122 and mass 130 and is configured for attachment to an internal wall or surface of a hollow compartment. Mounting assembly 132 is affixed at one end to central portion 124. At an opposite end, mounting assembly 132 is configured for attachment to a wall of a hollow compartment into which acoustic baffle assembly 120 is to be mounted. In the illustrated embodiment, mounting assembly 132 includes a threaded or Christmas tree fastener. In other embodiments, other manners of attaching mounting assembly 132 to the wall of the compartment may be employed including, without limitation, the use of adhesives, welding, brazing, and the use of other mechanical fasteners such as flexible plastic clips. In the illustrated embodiment, mounting member 132 includes a first rectangular portion 134 and a second rectangular portion 136. The first rectangular portion 134 is substantially perpendicular to second rectangular portion 136. This configuration may be optimal for supporting acoustic baffle assembly 120 in an upright position within a substantially rectangular hollow compartment. For non-rectangular hollow compartments, configurations other than a perpendicular orientation between first rectangular portion and second rectangular portion 136 may be appropriate.

First rectangular portion 134 has a length L. In some embodiments, it may be desirable for length L to be approximately equal to one half of the width of the hollow compartment into which acoustic baffle assembly 120 is to be mounted. This configuration would dispose acoustic baffle assembly 120 generally in the center of the hollow compartment. It may be desirable to have a plurality of mounting assemblies 132 having first rectangular portions 134 of different lengths L to accommodate differently sized hollow compartments. In other embodiments, length L of first rectangular portion 134 may not be substantially equal to one half the width of the hollow compartment and acoustic baffle assembly 120 may not generally centered within the hollow compartment. Mounting assembly 132 may be made using an adjustable mold which will produce mounting assemblies 132 having first rectangular portions 134 of different lengths.

Mounting assembly 132 may be made of any material including nylon, polyester, EVA, cross-linked polyethylene, polypropylene, TPE (thermoplastic elastomer), TPO (thermoplastic olefin), TPV (thermoplastic vulcanite), polyurethane, epoxy, rubber (EPDM, SBR, natural rubber, neoprene, reclaim, silicone), PVC, acrylic, polycarbonate, polystyrene, PET, and polylactic acid. Preferably, the material used to make mounting assembly 132 is selected to have sufficient heat resistance so as to avoid significant drooping or distortion of the mounting assembly when the acoustic baffle assembly is subjected to heating for the purpose of activating the mass of heat activated expandable material. In the illustrated embodiment, mounting assembly 132 is attached to central portion 124 using a mechanical fastener. In other embodiments, heat staking, and adhesive, and other mechanical fasteners, including, but not limited to, "Christmas tree" type pins and flexible clips made of plastic, may be used to attach mounting assembly 132 to substrate 122. Mounting assembly 132 is attached to substrate 122 at substantially a center of central portion 124. In other embodiments, mounting assembly 132 may be attached to an off center portion of central portion 124. In still other embodiments, substrate 122 and mounting assembly 132 may be integrally formed. For example, mounting assembly 132 and substrate 122 may be integrally formed from a thermoplastic such as a polyamide using injection molding.

Figure 15:
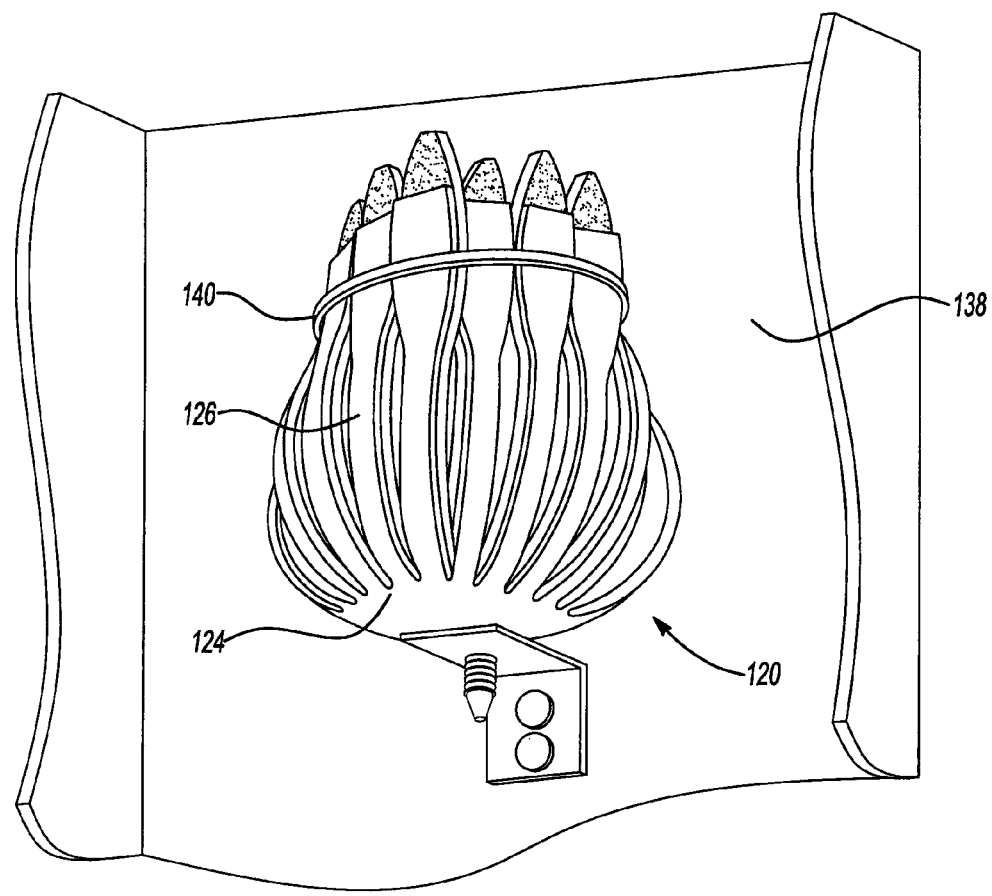
FIG. 15 is a perspective view illustrating the acoustic baffle assembly of FIG. 14 with a plurality of flexible elongate arms restrained in a first configuration.

With respect to FIG. 15, acoustic baffle assembly 120 is illustrated in a compact configuration mounted to a wall 138 of the hollow compartment. As depicted, the elongate arms 126 have been bent in an upward direction and held together by a band 140. In other embodiments, compact acoustic baffle assembly 120 may be supported in other than an upward direction. For instance and without limitation, compact acoustic baffle assembly 120 may be supported with elongate arms 126 extending horizontally or downwardly.

In the depicted embodiment, band 140 is a thermoplastic band that retains elongate arms 126 in a deformed state making acoustic baffle assembly 120 compact. In this compact configuration, acoustic baffle assembly 120 may be installed within a hollow compartment having a cross sectional dimension that is smaller than the dimensions of a perimeter formed by tips 128 of elongate arms 126 when elongate arms 126 are unrestrained and outstretched. In some embodiments, band 140 may have a sharp melting point which means that band 140 will rapidly disintegrate when the ambient temperature reaches its melting point. In the depicted embodiment, band 140 has a melting point of approximately 150° F. to 160° F. In other embodiments, the melting point of band 140 may be higher than 160° F. but less than the temperature at which mass 130 activates. In still other embodiments, band 140 may have a melting point lower than 150° F., but preferably higher than temperatures typically encountered by goods in transit to allow band 140 to withstand the temperature variations of shipping. In some embodiments, the melting point of band 140 will be no lower than −100° C. Band 140 may be made of any suitable material including, but not limited to, styrene block copolymers such as styrene-butadiene-styrene (SBS) and styrene-isoprene-styrene (SIS) thermoplastic elastomers.

Band 140 may be applied manually by first bending elongate arms 126 in an upward direction and then placing band 140 around the upwardly stretch elongate arms 126. In other embodiments, band 410 may be robotically applied. In still other embodiments, acoustic baffle assembly 120 may not include band 140. Instead, acoustic baffle assembly 120 may be positioned within a hollow compartment and affixed to wall 138 by first positioning acoustic baffle 120 with elongate arms 126 outstretched over an upper portion of the hollow compartment and then pushing on acoustic baffle assembly 120 from above or pulling from below such that the walls of the hollow compartment will bend elongate arms 126 in an upward direction as acoustic baffle assembly 120 moves downwardly. In such embodiments, acoustic baffle assembly 120 may be affixed to wall 138 at a desired location and elongate arms 126 will be restrained by the walls of the hollow compartment.

When acoustic baffle assembly 120 is positioned within the hollow compartment and elongate arms 126 are restrained in a compact, generally upright position by band 140, acoustic baffle assembly 120 is ready for activation. So long as neither a first predetermined temperature (a temperature at which expandable mass 130 activates) nor a second predetermined temperature (the temperature at which band 140 melts), is reached, acoustic baffle assembly 120 will remain in the compact configuration illustrated in FIG. 15.

With respect to FIG. 16, acoustic baffle assembly 120 is illustrated in a configuration that simulates a first stage of a typical baking process wherein the ambient temperature inside the hollow compartment has reached or exceeds the melting point of band 140. As depicted, once band 140 has melted, elongate arms 126 move outwardly from the compact configuration depicted in FIG. 15 in an attempt to return to the generally flat configuration illustrated in FIG. 14. In this manner, elongate arms 126 are thrown outwardly until they are obstructed from further outward motion by the walls of the hollow compartment. By using an acoustic baffle assembly whose tips 128 define a perimeter exceeding the cross-sectional dimensions of the compartment, elongate arms 126 will be long enough to reach into the corners where the walls of the hollow compartment intersect. In this manner, substantially an entire cross-sectional segment of the hollow compartment will contain a portion of mass 130. This can be helpful to ensure a complete seal of the hollow compartment once mass 130 activates.

In embodiments where mass 130 extends beyond tip 128, when band 140 melts and elongate arms 126 move outwardly to the walls of the hollow compartment, a portion of mass 130 contacts the walls of the hollow compartment. This can be useful later during thermal activation of mass 130 to guide the expansion of mass 130. Once it is activated, mass 130 is capable of bonding to both bare metal and to the e-coated walls of a hollow compartment. Therefore, because mass 130 is partially in contact with the walls prior to activation, the illustrated configuration will ensure a good bond between the activated mastic and the inner walls of the hollow compartment. In embodiments where mass 130 is supported primarily or solely on central portion 124, once mass (or masses) 130 is heated to the activation temperature, mass 130 will expand along outstretched elongate arms 126 and then upwardly from there along the walls of the hollow compartment.

Figure 17:
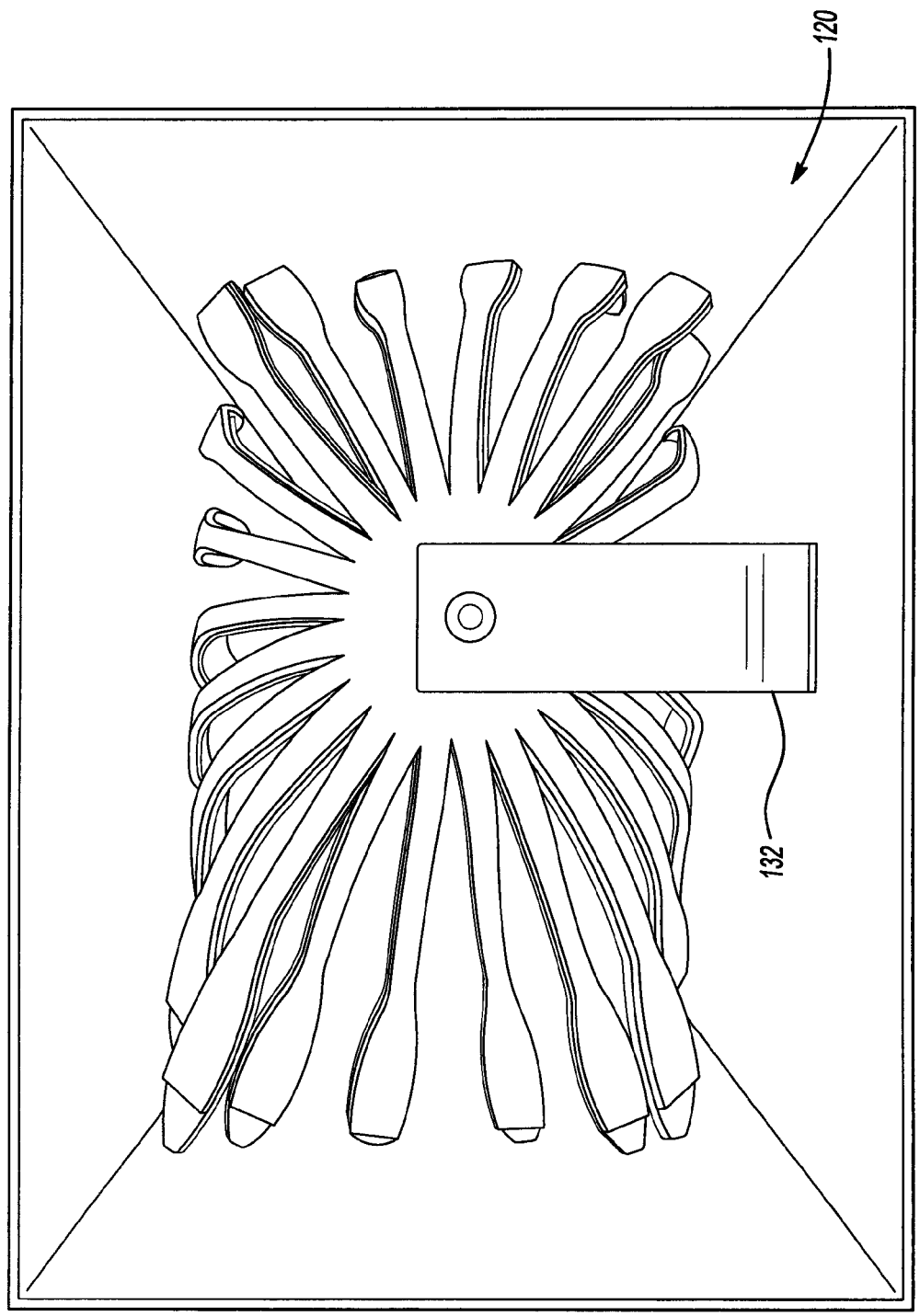
FIG. 17 is a perspective cross-sectional view taken from a position below the hollow body of FIG. 16.

FIG. 17 illustrates the acoustic baffle assembly 120 of FIG. 16 from an area underneath acoustic baffle assembly 120. In this view, mounting assembly 132 is clearly visible supporting acoustic baffle assembly 120 in a central portion of the hollow compartment.

Figure 18:
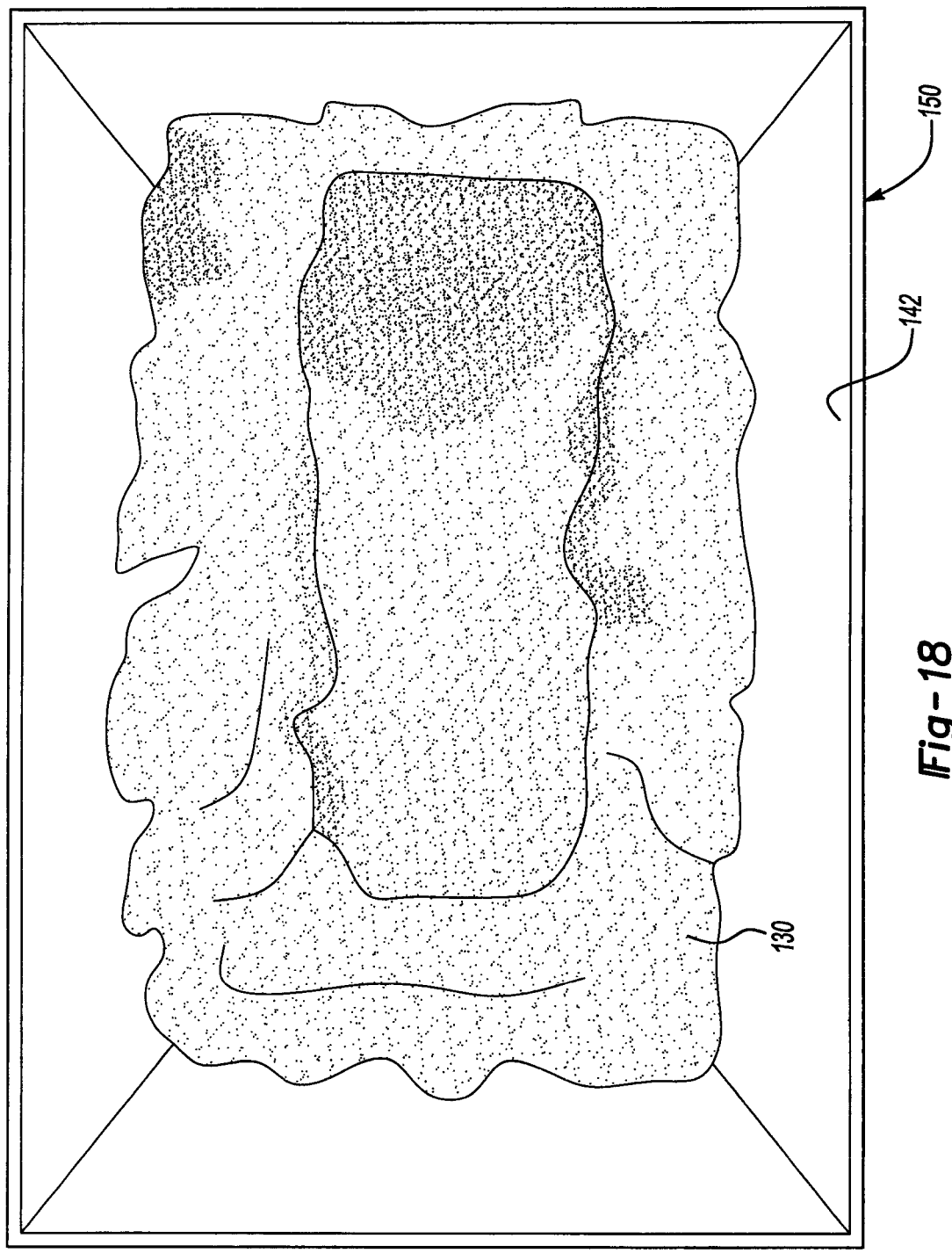

With respect to FIG. 18, the acoustic baffle assembly 120 is illustrated subsequent to actuation of mass 130 from a position above acoustic baffle assembly 120. As depicted, mass 130 has expanded volumetrically by between 2,000% and 3,000%, completely filling and sealing a cross-section of the hollow compartment. Portions of mass 130 can be seen adhering to the walls 142 of the hollow compartment 150 illustrated in FIGS. 18 and 19.

FIG. 19 illustrates an underside of acoustic baffle assembly 120. Elongate arms 126 remain in substantially the same position they occupied prior to heat actuation of mass 130 and have thus supported mass 130 during its expansion.

It may be preferable to produce acoustic baffle assemblies 120 having a few standard or universal sizes. For instance, acoustic baffle assemblies 120 wherein tips 128 form a circle having a 5 inch diameter, a 10 inch diameter and a 15 inch diameter may be sufficient to accommodate most, if not all, baffling applications. Having a few standard configurations rather than tailoring the dimensions of acoustic baffle assembly 120 for specific applications lowers mold tooling costs as only a few molds are needed to cover virtually the entire range of applications.

Figure 20:
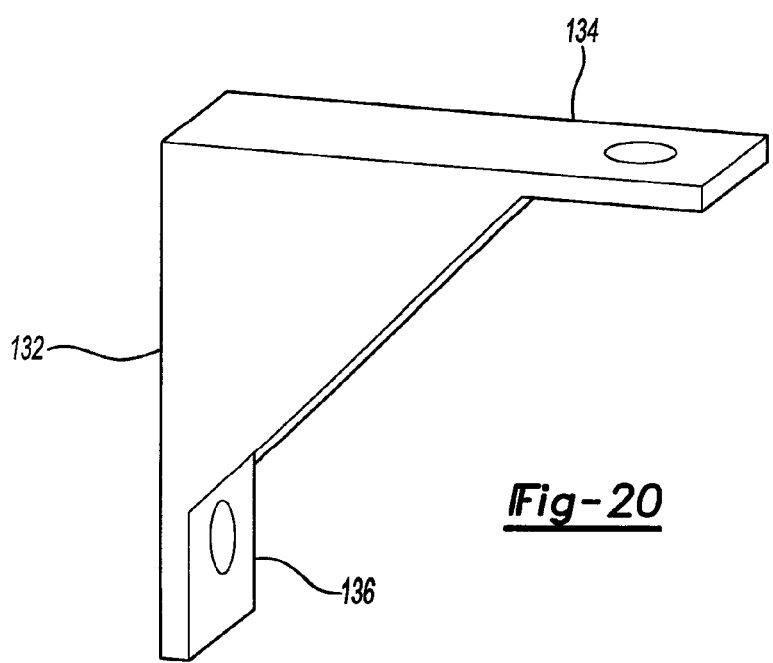
FIG. 20 is a perspective view illustrating an exemplary mounting bracket for mounting the acoustic baffle assembly of FIG. 14 to a hollow body.

With respect to FIG. 20, mounting assembly 132 is illustrated. As indicated in this slide, first rectangular portion 134 may have a variable length. In some embodiments, the length of first rectangular portion 134 may vary from between 1 and 4 inches. In other embodiments, the length may reach 6 inches. In still other embodiments, the length may reach 8 inches. Use of an adjustable mold can reduce costs associated with producing mounting assemblies of varying lengths.

The invention disclosed herein and described in various embodiments above yields a number of benefits to a manufacturer employing these methods, including low tooling costs, new design options, fewer manufacturing changes (such as mold and material purges) and compatibility with new technologies such as increasingly expandable mastics. Similar benefits are enjoyed by customers of such manufacturers include low to no tooling costs, better acoustic properties, the use of common parts and therefore reduced part numbers for multiple applications, low part weight and lower costs, to name a few.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An acoustic baffle assembly for sealing or baffling a hollow body, the acoustic baffle assembly comprising;

a mass of heat activated expandable material capable of activating at a predetermined temperature, the mass defining a first perimeter; and a substrate supporting the mass, the substrate having a central portion supporting a portion of the mass and spaced apart projections extending radially outward from the central portion, the spaced apart projections defining a second perimeter, the second perimeter being larger than the first perimeter, such that a substantial portion of the first perimeter falls within the second perimeter, wherein the projections are configured to control expansion of the mass.

2. The acoustic baffle assembly of claim 1 wherein the substrate has a first side and a second side, wherein the mass is disposed on the first side, and the projections are configured to guide expansion of the mass away from the second side.

3. The acoustic baffle assembly of claim 1 wherein, prior to expansion, substantially the entire mass is supported on the central portion.

4. The acoustic baffle assembly of claim 1 wherein, prior to expansion, a first portion of the mass is supported on the central portion and a second portion of the mass is supported on the projections.

5. The acoustic baffle assembly of claim 1 wherein, prior to expansion, a portion of the mass is supported on the projections, and wherein a portion of the mass extends beyond an outer end of at least one of the projections.

6. The acoustic baffle assembly of claim 1 wherein the spaced apart projections are substantially coplanar with the central portion.

7. An acoustic baffle assembly for sealing or baffling a hollow body, the acoustic baffle assembly comprising:

a mass of heat activated expandable material capable of activating at a predetermined temperature, the mass defining a first perimeter; and a substrate supporting the mass, the substrate having a central portion and fingers projecting outwardly from the central portion, an outer end of each of the fingers defining a second perimeter, the second perimeter being larger than the first perimeter, wherein the mass of heat activated expandable material is disposed on the substrate such that a substantial portion of the first perimeter falls within the second perimeter and wherein the fingers are configured to control expansion of the mass.

8. The acoustic baffle assembly of claim 7 wherein each of the fingers is at least partially coplanar with the central portion.

9. The acoustic baffle assembly of claim 7 wherein a notch is defined in one of the central portion and the fingers to permit flexure of the fingers.

10. The acoustic baffle assembly of claim 7 wherein the substrate comprises a dimensionally heat stable polymeric material.

11. The acoustic baffle assembly of claim 7 wherein the fingers are generally coplanar with the central portion and project outwardly from the central portion.

12. The acoustic baffle assembly of claim 7 wherein the fingers are configured to cooperate with each other to control expansion of the mass in a desired direction.

13. An acoustic baffle assembly for sealing or baffling a hollow body defined by a plurality of walls, the acoustic baffle assembly comprising:

a mass of heat activated expandable material capable of activating at a first predetermined temperature;

a substrate supporting the mass, the substrate having a central portion and flexible elongate arms extending outwardly from the central portion; and a band disposed around the flexible elongate arms, the band flexing the flexible elongate arms in an axial direction with respect to the central portion and restraining the flexible elongate arms in a first configuration, the band having a melting point of a second predetermined temperature that is lower than the first predetermined temperature, wherein the flexible elongate arms are configured to move outwardly from the first configuration when the band sufficiently melts.

14. The acoustic baffle assembly of claim 13 wherein an outer tip of each of the flexible elongate arms comprises a generally circular perimeter.

15. The acoustic baffle assembly of claim 13 wherein the flexible elongate arms are biased to move outwardly from the first configuration when the band sufficiently melts.

16. The acoustic baffle assembly of claim 13 wherein the mass extends beyond an outer tip of at least one of the flexible elongate arms.

17. The acoustic baffle assembly of claim 13 wherein at least a portion of each of the flexible elongate arms is generally coplanar with the central portion.

18. The acoustic baffle assembly of claim 13 wherein the flexible elongate arms each have a proximal end that is adjacent the central portion and a distal end that is remote from the central portion and wherein a width of at least one of the flexible elongate arms generally increases from the proximal end to the distal end.

19. The acoustic baffle assembly of claim 13 wherein the flexible elongate arms are configured to cooperate with each other to control expansion of the mass in a desired direction.

20. An acoustic baffle assembly for sealing or baffling a hollow body, the acoustic baffle assembly comprising:

a mass of heat activated expandable material capable of activating at a predetermined temperature, the mass defining a first perimeter; and a substrate supporting the mass, the substrate having a central portion supporting a portion of the mass and fingers projecting outwardly from the central portion, the fingers defining a peripheral portion radially outward from the central portion, an outer end of each of the fingers defining a second perimeter, the second perimeter being larger than the first perimeter when viewed on a plane normal to the central axis of the hollow body, wherein the mass of heat activated expandable material is disposed on the substrate such that a substantial portion of the first perimeter falls within the second perimeter and wherein the fingers are configured to control expansion of the mass.

* * * * *